United States Patent [19]

Cheek et al.

[11] Patent Number: 4,675,833

[45] Date of Patent: Jun. 23, 1987

[54] PROCESSOR CONTROLLED PHOTOCOMPOSITION SYSTEM

[75] Inventors: Thomas B. Cheek, Lexington; Christian Bourdin, Natick, both of Mass.

[73] Assignee: Xyvision, Inc., Woburn, Mass.

[21] Appl. No.: 599,758

[22] Filed: Apr. 13, 1984

[51] Int. Cl.⁴ .................... G06F 15/626; G06F 15/40
[52] U.S. Cl. .................................. 364/523; 340/716; 340/750; 358/30; 364/518; 364/522
[58] Field of Search ............................... 364/518–523; 340/716, 750, 721; 358/30

[56] References Cited

U.S. PATENT DOCUMENTS

| | | | |
|---|---|---|---|
| 3,821,730 | 6/1974 | Carey et al. | 340/750 |
| 4,209,832 | 6/1980 | Gilham et al. | 364/521 |
| 4,240,075 | 12/1980 | Bringol | 340/750 |
| 4,298,945 | 11/1981 | Kyte et al. | 364/521 |
| 4,317,114 | 2/1982 | Walker | 340/721 |

OTHER PUBLICATIONS

"Product Profile", Published by Xyvision, Inc. Date Unknown.
"Image Controller Theory of Operation", Published by Xyvision, Inc. Date Unknown.

Primary Examiner—Errol A. Krass
Assistant Examiner—Kevin J. Teska
Attorney, Agent, or Firm—Weingarten, Schurgin, Gagnebin & Hayes

[57] ABSTRACT

A photocomposition system operating under microprocessor control to load, and alternatively display, character data from two respective bit maps. The data is assembled in the bit maps as a series of vertically adjacent video words generated from font data stored as a series of character boundary points and loaded into the bit maps in a controlled fashion to avoid destructive interference with image data already stored in the bit maps. Data in the bit maps can be displayed either on a CRT or via a laser printer or photocomposition system. System memory includes a plurality of fonts of data in which the characters are segmented into short segments and the boundary points thereof digitally recorded. From the recorded points, a curve fit of an arc section is used to define the complete character boundary for each segment and video data words are generated to indicate the boundaries on the vertical segments of the character defined by the arc sections fit to the recorded points. This video data is then applied to an image processor. While one bit map is used to generate display information, the other is loaded with each incoming video data word by cycling bit map data through an arithmetic logic unit controlled by the image controller to prevent newly inserted data from destructive interference with data already assembled in the bit map.

12 Claims, 8 Drawing Figures

PROCESSOR CONTROLLED PHOTOCOMPOSITION SYSTEM

FIELD AND BACKGROUND OF THE INVENTION

Microprocessor controlled photocomposition systems and other printers are used to set up and edit text to be printed as books, magazines, pamphlets, or otherwise. Such systems need to combine the capabilities of word processing to provide for ease of entry and revision along with the more sophisticated abilities to automatically select multiple fonts of varying type size and orientation. Because photocomposition systems require access to many fonts and are not limited to a single character type as in word processing, much system complexity is directed toward the ability to handle many fonts quickly and efficiently.

Photocomposition systems must deal with a large variety of fonts and sizes. The storage of data representing the fonts, the process of accessing selected font characters and the process of displaying them rapidly in response to keyboard operator selection, without using enormous amounts of expensive memory and processing capability, places a difficult demand upon photocomposition system design. In addition, because of the editing flexibility required for a photocomposition system, characters being set up on the display will frequently overlap adjacent characters. Thus, adding or editing a character in such an overlapping arrangement can readily lead to destructive interference with existing characters as each new character is added to the display. This, of course, will yield intolerable output results, so a great deal of complexity may be required in the system in order to avoid such interference.

BRIEF SUMMARY OF THE INVENTION

In accordance with the teaching of the present invention, a microprocessor controlled photocomposition or printing system is provided in which print set up, in a vast array of fonts, font size and styles, operates efficiently with minimal memory and a sophisticated character generation system that provides for high speed assembly and display of desired characters and selected fonts without destructive interference with preexisting display characters.

In practicing the invention according to a preferred embodiment, characters are divided into a series of vertically adjacent segments, each having horizontal top and bottom boundaries where the segments lie adjacent and having left and right hand boundaries corresponding to the actual character boundaries themselves. These segments are identified in system memory by the left and right end points of the horizontal top and bottom segments and by a mid point between each end point. As each character is specified by keyboard operator selection, the parameters for each segment are accessed one by one. For each segment a plurality of vertically adjacent horizontally extending video data words are generated, representing character length in each slice in combination with data representing slice position. The boundaries for the left and right hand transitions between white and black in the video data word are calculated using a curve fit to the digitally recorded end points and mid point. An arc section is used to fit the points.

The entire display screen is divided horizontally into a number of pixel elements, typically 2,048 elements. These are then subdivided into 32 bit frames each comprising two 16 bit slots. The 16 bit digital video word generated for each horizontal slice in each character segment will typically span more than one slot, but is treated as though it occupied only one slot and is accompanied by a slot position word which identifies the number of bit shifts to the right necessary to move the slot into the actual position, relative to predefined display screen slot positions, that it must be shifted in order to occupy its proper position relative to all the other characters in the display. A pair of digital bit maps are provided to drive the display and to receive update information alternatively. While one bit map is being operated to drive the display, the other bit map has its digital information read through an arithmetic logic unit where it is combined with the shifted video data word generated for each character. The combining function is logically controlled to insure that the newly inserted video data word slice does not destructively interfere with existing character boundaries in the preexisting display.

After a video word has been thus inserted, the bit maps exhanged their function. This provides immediate updating of the display while avoiding any blank intervals during the composition of each character.

DESCRIPTION OF THE DRAWING

These and other features of the present invention are fully setforth below in the accompanying, solely exemplary detailed description of the present invention and accompanying drawings of which:

FIG. 1 is a representation of a particular character segmentation in a predetermined font according to the present invention;

FIG. 2 is a diagram of hypothetical character segments on the background of a grid defining display pixel elements;

FIG. 3 illustrates slices through a character segment in accordance with the present invention;

FIG. 4 illustrates a video data word including a slice of character segment and in particular the potential overlapping of characters and corresponding video words in photocomposition systems;

FIG. 5 is a generalized block diagram of the processor controlled photocomposition system according to the present invention;

FIG. 6 illustrates video data word formatting in accordance with the present invention;

FIG. 7 is a system block diagram of the processor controlled photocomposition system of the present invention; and FIG. 8 is a flow chart representation of the operation of FIG. 7 in assembling video data words according to the present invention.

DETAILED DESCRIPTION

The present invention contemplates a microprocessor controlled photocomposition system in which memory is efficiently utilized by storing a wide variety of character fonts in data memory. These fonts are described there in accordance with a minimal number of parameters. Video data is generated from the stored parameters for each character and font selected by a keyboard operator in a manner which provides for its rapid assembly onto the display surface in the selected font, size, and orientation, without destructive interference with preexisting data already in the display memory.

Figure 1:
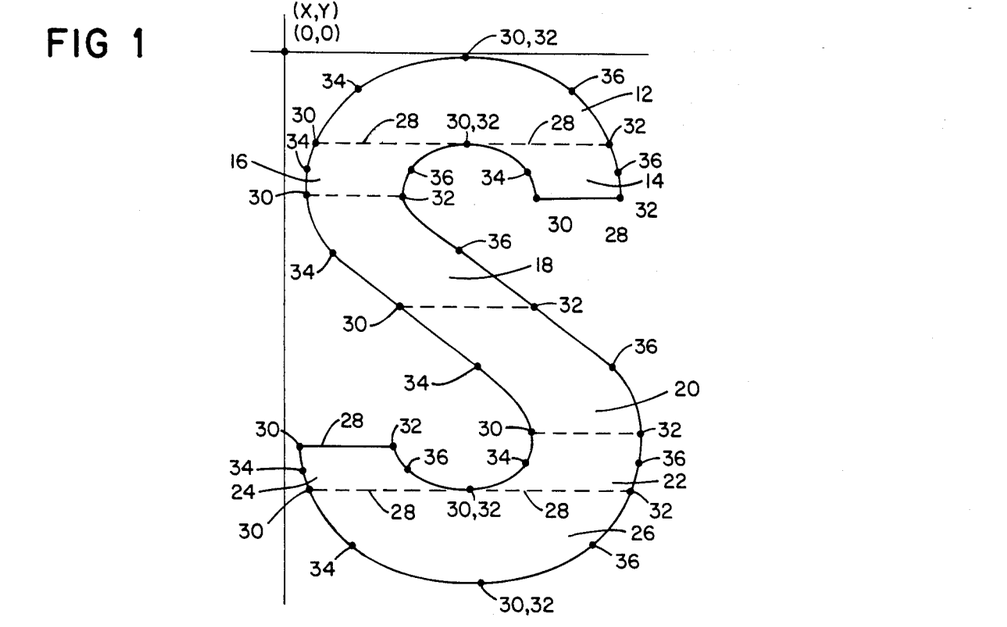

As illustrated in FIG. 1 for the character "S" in a selected font, each character in each desired font is divided into a plurality of segments such as the segments 12-26 illustrated in FIG. 1. These segments will be vertically adjacent at horizontal lines 28 forming the top and bottom portions of the adjacent segments. The segments are specified by left and right hand end points 30 and 32 for the top and bottom boundaries 28 and by intermediate mid points 34 and 36 on the character boundary located between each of the respective left and right end points 30 and 32. Each of the X,Y coordinates for each of these segment defining points is stored in digital memory and from them the entire character can be specified and displayed as described below.

Figure 2:
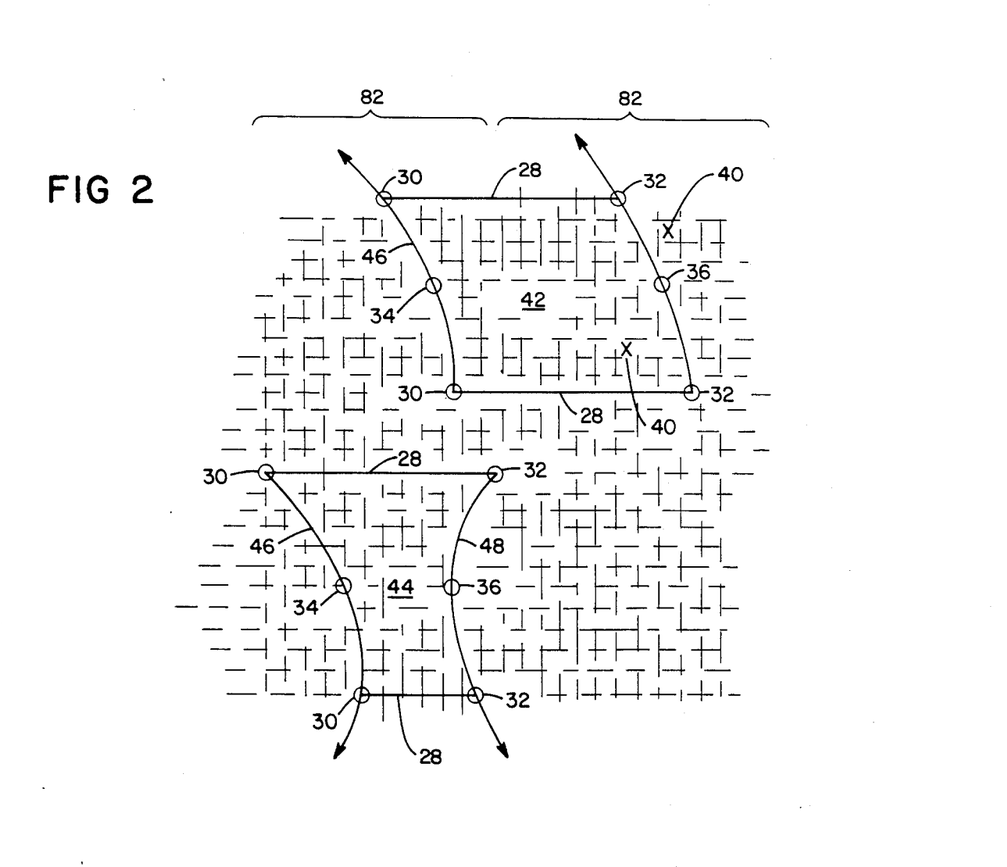

When a character is to be displayed, it will be presented upon a display screen which typically is divided up into a plurality of pixel elements, such as the elements 40 illustrated in FIG. 2. A typical display will involve approximately 2048 by 1024 pixel elements over the screen surface.

Figure 3:
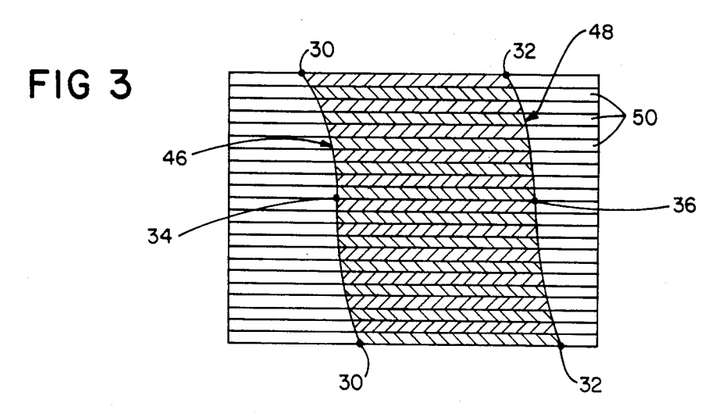

As each segment, such as the segments 42 and 44 represented in FIG. 2, is to be displayed, a video word will be generated consisting of a series of digital ones and zeros, each corresponding to one of the pixel elements 40. In the case where the display is to be in a black on white format, with ones representing the black and zeros representing the white designation, the bits change at the boundaries represented by the left and right hand vertical line segments 46 and 48. Each segment will then be represented as a series of video word slices 50 as shown in FIG. 3.

Figure 5:
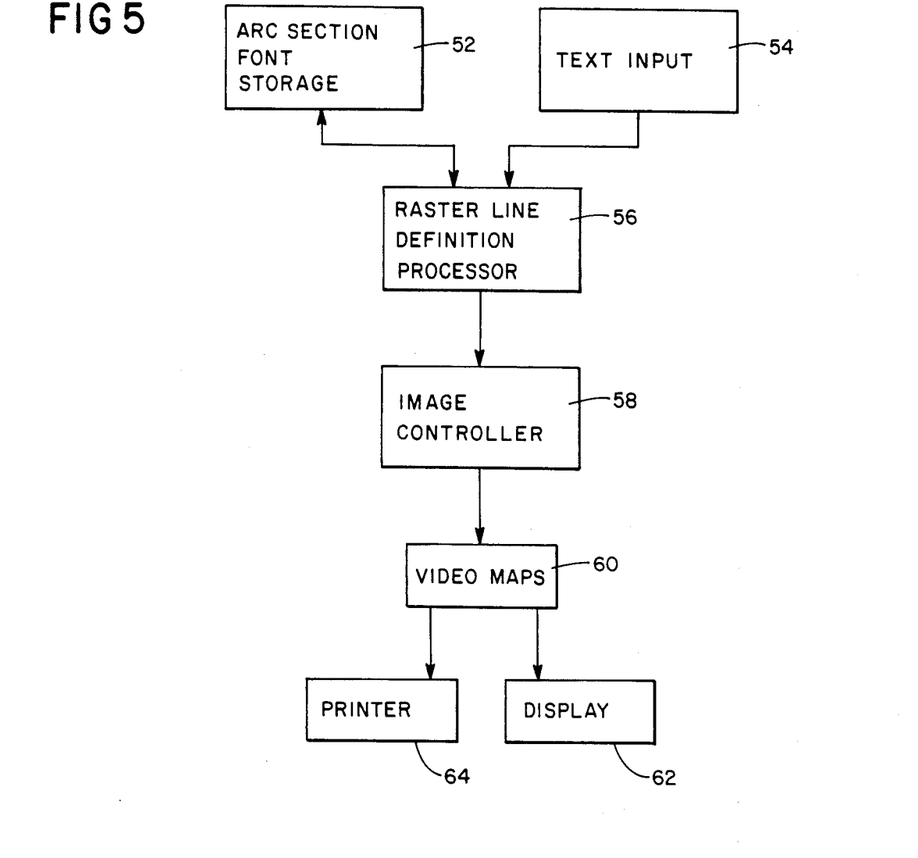

A generalized block diagram, FIG. 5, illustrates a memory 52 containing the sequence of position points 30, 32, 34, 36 for each of the segments for each character in a desired font. A particular character and font designation, along with sizes and slant data, is provided through an input terminal or key board 54 to a microprocessor operating as a raster line definition system 56. System 56 accesses the font data from the memory 32 to compose data representing the series of vertically adjacent digital words 50 illustrated in FIG. 3 and to transmit the data to an image generator or controller 58 which assembles them onto a pair of video bit maps 60. The video maps 60 are then used to drive a display 62 such as a CRT display to confirm to the operator at the text input terminal 54 that the selected character has been provided in a desired location and font. A laser or other printer 64 may also be operated from the data stored in the video maps 60, or printing plates generated therefrom in a photocomposition system.

Figure 4:
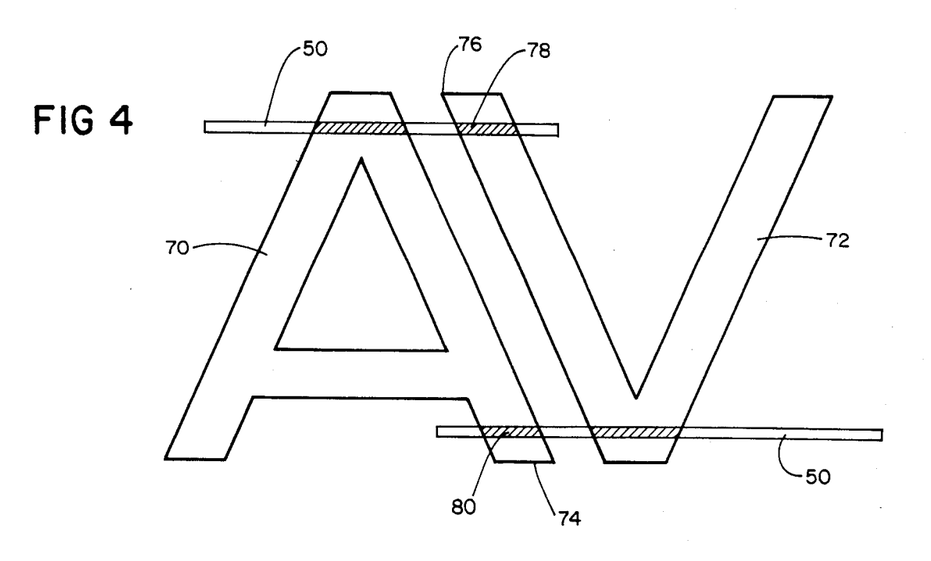

As illustrated in FIG. 4, a pair of characters such as the characters 70 and 72 to be displayed from the data contained in the video maps 60 may overlap at vertically different positions such as the portions 74 and 76. More particularly, the video words 50 which are utilized to generate each of the characters 70 and 72 in the video maps 60 may extend substantially beyond the edge of each of the characters and destructively interfere with a portion of the adjacent character as illustrated. In this case, the digital word 50 for the character 70 illustrated, when placed onto the video map, would result in the erosion of the portion 78 of the character 72. Similarly, the video word 50 illustrated for the character 72 when applied to the bit map in which the character 70 already existed would result in the erosion of the portion 80 from the character 70. This, of course, is unacceptable. The image generator 58 described below with respect to FIG. 7 is operated to merge the video words into the video maps 60 in such manner as to avoid such interference.

Figure 6:
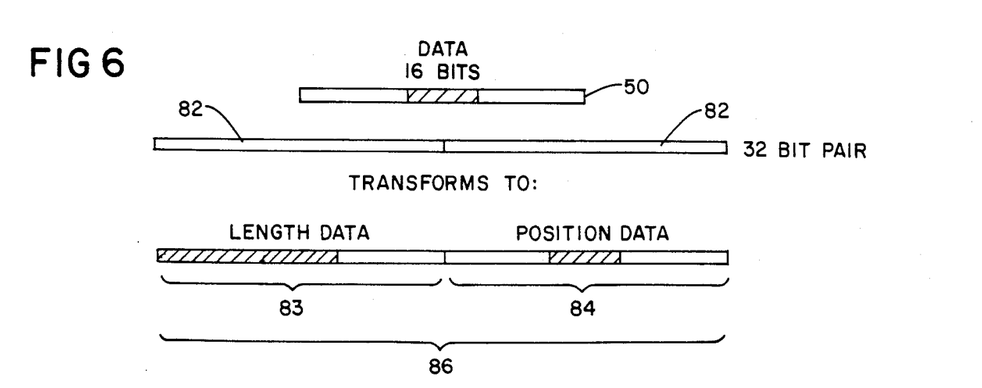

As a part of the interference protection, the raster line definition processor 56 describes the video words 50 as separate length and position data. The display screen pixels 40 illustrated in FIG. 2 are typically divided into a plurality of slots 82 in a predetermined position or relationship over the display screen and accordingly in the memory of the video maps 60. Typically, the video word 50 as illustrated in FIG. 6 will span a set of slots 82 in, for example, a 32 bit pairing of slots. The video word 50 is represented as a data word 86 which comprises length data 83 for the video word 50 and positional data 84. Word 83 contains the black (or white) length to be displayed, left justified. Word 84 identifies the amount of shift required for the length word 83 as to be moved from one of the bit maps slots to its desired position within the bit map, and correspondingly in the display.

Figure 7:
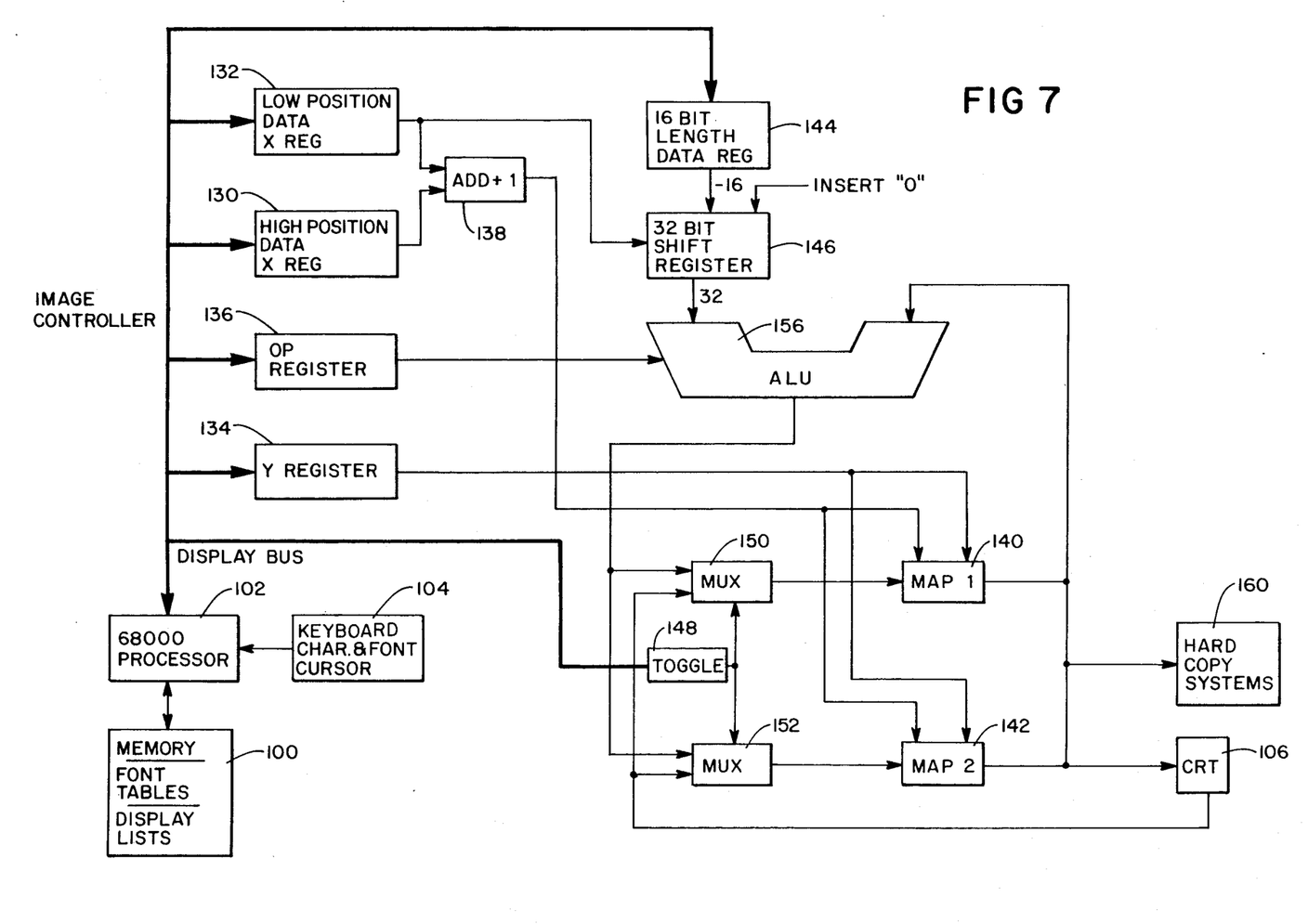

The data word 86 is generated by the raster line definition processor 56 for application to the image controller 58, illustrated in detail in FIG. 7. With respect to FIG. 7, the system block diagram illustrates a memory 100, corresponding generally to the memory 52 illustrated in FIG. 5. A motorola 68,000 microprocessor 102 accesses the memory 100 in response to the entries from a keyboard 104 specifying character and font along with size and position for ultimate production onto a display 106, as described above with respect to FIG. 5. The operation of the processor 102 in generating the individual video words 50 is governed in accordance with the flow chart of FIG. 8.

Figure 8:
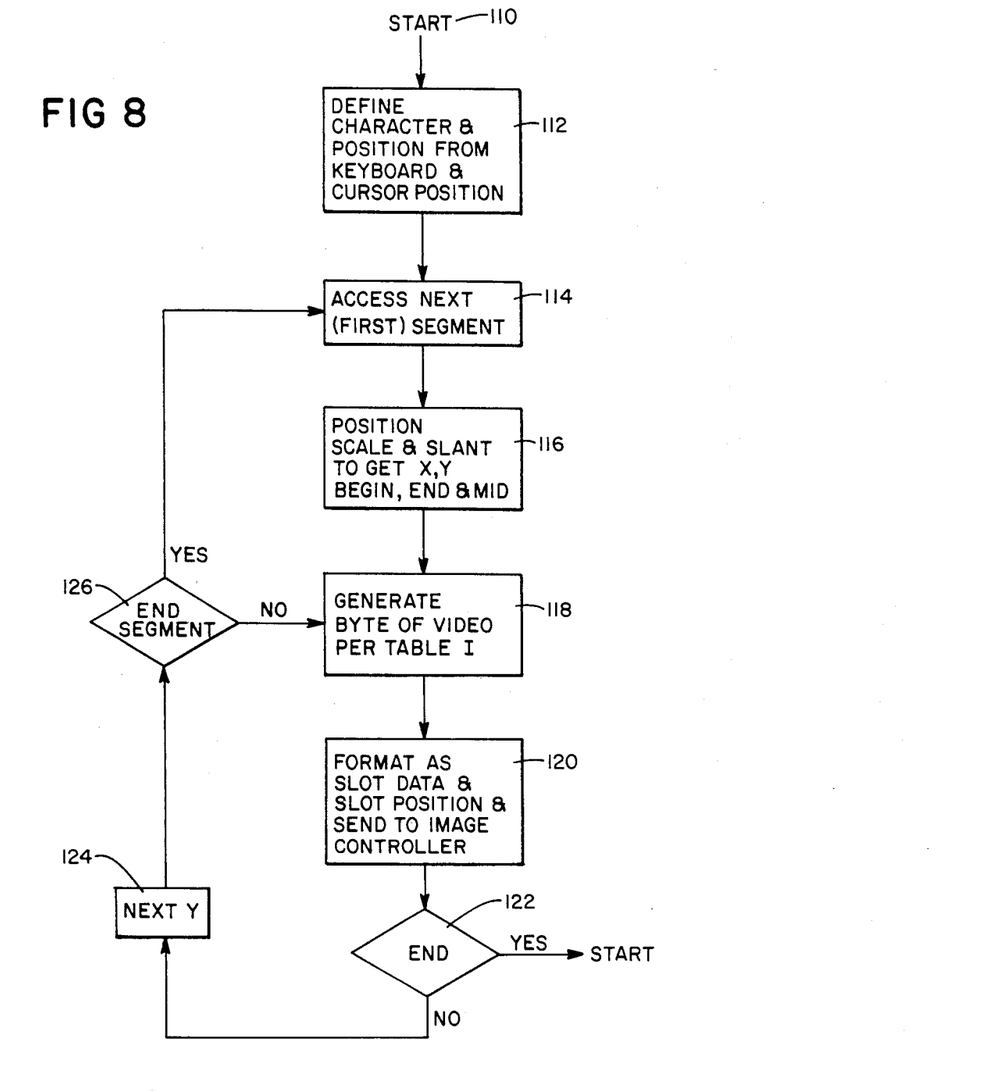

As shown in FIG. 8, the system waits in a start state 110 until a character and its font position and size characteristics are specified by keyboard entry in a step 112. The data points 30, 32, 34, 36 for each segment of the desired character are accessed in memory in a step 114 for the first segment for the defined character. In a subsequent step 116 this data is converted according to the desired position, scale, and slanting of the font to the actual X,Y position that the segment will ultimately wind up occupying on the display. Transformation tables to accomplish selected change are typically stored in memory. The segment is now effectively mapped, by its defining points, onto the pixel grid of the system as represented by FIGS. 2 or 3 above. In a subsequent step 118 the individual video words 50 are generated, defining the boundaries 46 and 48 in accordance with a curve fitting technique, typically fitting an arc section curve to the segments. Table 1 identifies the algorithmic or mathematical operations performed by the step 118 to generate the X and Y position of the lines 46 and 48 (FIG. 3) in defining the transitions between black and white upon crossing the lines 46 and 48. These end points define each video word 50. The video word 50 is then converted, in a step 120, from the raw video word 50 illustrated in FIG. 6 to the ultimate data word 86 containing the video length data and the positional data. After step 120, a step 122 tests for whether that previously generated video word completes the generation of video words for that character, in which case processing loops back to start. If the character has not been completed, processing increments the Y value by one in a step 124 to index the video generation to the next vertically adjacent slice in the character segment. A subsequent test 126 determines whether processing has finished a segment, in which case processing loops back to step 114. If more video words for the same segment are required, processing branches to step 118. In this manner, an entire character is converted from the stored end points 30, 32, 34, and 36 into a succession of vertically adjacent video words 50 spread out through all of the segments for that character.

Returning to FIG. 7, the video word thus generated by the processor 102 is applied to X registers 130 and 132 respectively to contain the high and low bits of position data. A Y register 134 also receives Y position data for that particular video slice from the processor 102 as determined by the incrementation in step 124. An operations register 136 is also loaded with data specifying a set of logical operations selected by the operator through the keyboard and described below.

The X registers 130 and 132 have their contents applied through an ADD 1 register 138 whose output defines which slot in the video map is being accessed. This is applied to each of first and second video bit maps 140 and 142. The video maps 140 and 142 also receive the output of the Y register 134. Together these inputs define which slots in which line in the 1,024 vertically spaced lines of video data stored by the bit maps 140 and 142 is applicable for the incoming video length data stored in a register 144.

The video length data is also applied to a register 144 and is in turn applied to a 32 bit shift register 146. The shift register 146 is controlled by the contents of the low order position bits in the X register 132 causing the 16 bit video length data to shift correspondingly in position within the 32 bit shift register 146 so as to reconstruct the video word 50 in correct position within a pair of slots 32.

A toggle switch 148 is controlled by data from the processor 102 to regulate a pair of multiplexers 150 and 152 such that one of the video maps 140, 142 is clocked by the display 106 clock to apply its output to a display 106 while the other of the video maps 140, 142 has data at the corresponding Y line applied through the multiplexer 150, or 152 to an arithmetic logic unit 156. The toggling occurs within each video word update.

In operation, as each video word is applied to the image controller processing circuitry of FIG. 7 from the microprocessor 102, it is shifted by the registers 140 and 146 back to its original positional relationship and applied to the arithmetic logic unit 156 along with the data from the same Y defined line in the selected video maps 140, 142. The arithmetic logic unit 156 is controlled by the operations register 136 to provide operator select visual formats of black on white, white on black, or alternate insert delete functions, applicable to a whole character. The video data is inserted into the bit stream for the Y line from the activated video map 140, 142 by the ALU 156 using or logic, and thus avoids destructive interference with existing data.

The data contained in the video maps 140, 142 is additionally made available to a hard copy system 160 which may be a laser printer or photocomposition system.

The above described embodiment thus provides a highly efficient and fast operating system for generating text output with a high degree of font flexibility and with protection against destructive interference with preexisting textual material. It will occur to those skilled in the art that modifications can be practiced within the scope of the invention as solely defined in the following claims.

TABLE I

Retrieve from memory and transform to get:
$X_e = X_{end}$  $Y_{Beg} = 0$
$X_m = X_{mid}$  $Y_{Beg} = 0$
$Y_e = Y_{end}$  $Y_{end} - Y_{Beg} \rightarrow$ counter Calculate $b' = f(X_m, Y_e)$; i.e. mathematical equation for the arc
$c' = g(X_e, Y_m)$; i.e. mathematical equation for the arc Calculate
$\Delta X = b' + c'$
$\Delta 2X = 2 c'$
$R = 0(Y_e^2/2)$ (Loops through all slices to generate X, Y for black white boundaries)
$Y = Y + 1$
$R = R + \Delta X$
if ($\Delta X > 0$)
while  $(R \geq Y_e^2)$
  $X = X + 1$
  $R = R - Y_e^2$
else
while  $(R \leq \emptyset)$
  $X = X - 1$
  $R = R + h(Y_e)$; eg $Y_e^2$
$\Delta X = \Delta X + \Delta 2X$
plot X,Y
IF COUNTER = EXIT
DECREMENT COUNTER
GOTO LOOP

What is claimed is:

1. A system for loading data into an output map for sending desired characters from the map to be displayed, said system comprising:

means for defining characters to be generated as a series of points along the boundaries of said characters;

means for providing operator identification of characters to be loaded into said output map at a designated position;

means responsive to the identified characters and their boundaries as defined by said defining means for generating video data words representing vertically adjacent slices of intensity data changing with character boundaries to be loaded in said output map; and means for inserting the video data word into the output map at the corresponding position to successively provide vertically adjacent horizontal segments in said output map to complete the representation of said character therein.

2. The system of claim 1 wherein:

said defining means for defining said characters in a series of segments, the segment being defined by left and right hand end points of a horizontal top and bottom boundary to each said segment and a mid point between the top and bottom left hand and top and bottom right hand end points respectively on the segment boundary between the respective end points.

3. The system of claim 2 wherein said generating means defines the character boundary within each video data word as a nonlinear curve fit to the respective three left hand and three right hand points along the character segment boundary.

4. The system of claim 3 wherein said nonlinear curve is an arc section.

5. The system of claim 1 wherein said defining means includes a digital memory for defining characters in a plurality of selectable fonts.

6. The system of claim 1 wherein:

said means for inserting includes means for avoiding destructive interference with adjacent data in said output map.

7. The system of claim 6 wherein said means for generating video data words include means for generating a multibit intensity data word and an associated shift position data word identifying the position of the video intensity data relative to a pattern of multibit data slots of said output map.

8. The system of claim 7 wherein said inserting means include means for processing data from said output map in combination with the video data words in a manner controlled to prevent destructive interference with data representing characters preexisting in said output map and for reapplying said processed output map data to said output map to provide output map data updated with the insertion of said video data words.

9. The system of claim 8 wherein:
said processing means include means for providing arithmetic operations in response to a control signal; and
said means for generating include means for providing said control signal.

10. The system of claim 1 wherein said output map includes first and second bit maps and means are provided for controlling said two bit maps for alternate operation as a source of output data for display and an active bit map for video data word insertion by said inserting means.

11. A system for loading data into an output map from which an output display means is driven, said system comprising:
means for generating a series of video data words representing video intensity in adjacent strips of a character to be recorded in said output map, the generated data words having character boundaries identified therein;
means for inserting said video data word into said output map at identified locations in association with data already stored in said output map; and
means for preventing destructive interference by inserted video data words of character boundaries contained in video data words previously recorded in said output map.

12. The system of claim 11 wherein said inserting means includes:
means for combining the video data word being inserted with video data words preexisting in said output map under logic control to prevent the over writing of character boundaries with data in the inserted video data word.

* * * * *

UNITED STATES PATENT AND TRADEMARK OFFICE
CERTIFICATE OF CORRECTION

PATENT NO. : 4,675,833

DATED : June 23, 1987

INVENTOR(S) : Thomas B. Cheek; Christian Bourdin

It is certified that error appears in the above-identified patent and that said Letters Patent is hereby corrected as shown below:

Column 5, line 16, "ADD 1" should read --ADD + 1--

Column 6, line 23, "IF COUNTER =   EXIT" should read
--IF COUNTER = 0 EXIT--

Signed and Sealed this

Twenty-fifth Day of October, 1988

Attest:

DONALD J. QUIGG

Attesting Officer

Commissioner of Patents and Trademarks